United States Patent

[11] 3,590,168

[72] Inventor Beverley R. Gooch
Sunnyvale, Calif.
[21] Appl. No. 794,918
[22] Filed Jan. 29, 1969
[45] Patented June 29, 1971
[73] Assignee Ampex Corporation
Redwood City, Calif.

[54] BIDIRECTIONAL CASSETTE HEAD
3 Claims, 6 Drawing Figs.

[52] U.S. Cl. .......... 179/100.2, 340/174.1, 346/74
[51] Int. Cl. .......... G11b 5/28
[50] Field of Search .......... 179/100.2 C, 100.2 D; 346/74 MC; 340/174.1 F

[56] References Cited

UNITED STATES PATENTS

| | | | |
|---|---|---|---|
| 3,521,006 | 7/1970 | Michael | 179/100.2 C |
| 2,418,542 | 4/1947 | Camras | 179/100.2 |
| 2,736,776 | 2/1956 | Camras | 179/100.2 |
| 2,793,253 | 5/1957 | Howey | 179/100.2 |
| 3,037,089 | 5/1962 | Warren | 179/100.2 |
| 3,316,359 | 4/1967 | Sakasegawa | 179/100.2 |
| 3,412,216 | 11/1968 | Rosado et al. | 179/100.2 |

*Primary Examiner*—Bernard Konick
*Assistant Examiner*—J. Russell Goudeau
*Attorney*—Robert G. Clay

ABSTRACT: A multichannel magnetic head assembly for a magnetic tape recorder having a narrow width tape, e.g. cassette tape recorder. The head is adapted to incorporate within a single structure provisions to record, play and erase audio signals on and off the tape in both tape directions.

INVENTOR.
BEVERLEY R. GOOCH

BY Thomas Schatzel

ATTORNEY

PATENTED JUN 29 1971 3,590,168

INVENTOR.
BEVERLEY R. GOOCH
BY Thomas Schatzel
ATTORNEY

INVENTOR.
BEVERLEY R. GOOCH
BY Thomas Schatzel
ATTORNEY

BIDIRECTIONAL CASSETTE HEAD

BACKGROUND OF THE INVENTION

In recent years there has been considerable demand in the consumer market to decrease the size of audio tape recorders. The demands have been to provide the highest quality sound reproduction with the smallest recorder package. This led to the advent of the cassette-type recorders in which the tape is generally of the nature of 150 mils in width, with the individual tracks in the order of 24 mils in width. Designing magnetic head structures for transducing the electrical signals to magnetic signals on the tape of such recorders became a significant factor in limiting the ultimate size of the recorder. Obviously, where a multiple number of tracks are placed on such a narrow tape crosstalk and output voltage become important considerations. Furthermore, for stereo record and playback the problem becomes more complex.

SUMMARY OF THE PRESENT INVENTION

The present invention provides a single structure magnetic head assembly adapted to accommodate stereo record and playback on a cassette-type tape recorder. The assembly is further adapted to provide bidirectional record, reproduce and erase operations on the tape. The design provides optimum packaging and is such that the erase transducer, though in the same assembly, may be electrically independent from the record transducers. The erase transducers are so designed that one transducer covers the width of a pair of tracks, e.g. a common pair of stereo tracks. The use of a common assembly carrying all of the individual transducers overcomes problems of proper alignment of individual erase heads with relationship to record/playback transducers as may otherwise be encountered where the individual transducers are in separate housings. In a preferred embodiment of the present assembly, the erase transducers are properly and permanently aligned with relationship to the record/playback transducers during manufacture of the head assembly and remain so during the life of the assembly. Each erase head is placed directly in front of the associated pair of record/playback heads. Thus, when the recorder is in the record mode the erase heads may erase the tape immediately before the tape passes over the record head.

Obviously, a key goal is to maintain minimum size, highest quality and low cost. In the present structure the various core members of the individual transducers are positioned to taper inwardly toward the head-to-tape interface surface. Accordingly, energizing coils may be wound upon the appropriate legs of the individual transducers in the areas where the various legs are positioned sufficiently apart. The assembly further includes a carrier which may be premolded or stamped to include appropriate permanent positioning means such that assembling and aligning of the complete assembly is simplified. The positioning means support the core and pole members of the various individual heads so as to limit the number of necessary external jigs during assembly of the composite assembly.

DESCRIPTION OF THE PREFERRED EMBODIMENT

Figure 1:
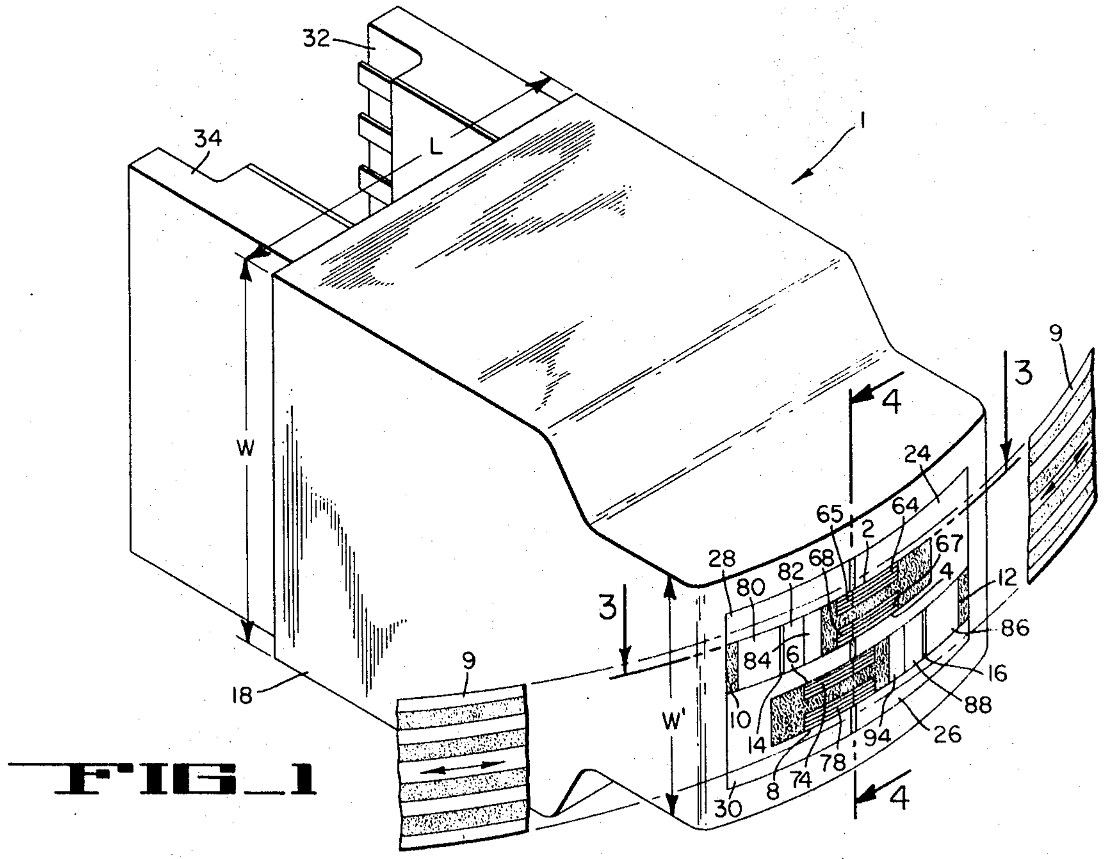
FIG. 1 is a perspective enlarged view of a magnetic head assembly according to the teachings of the present invention.
Figure 3:
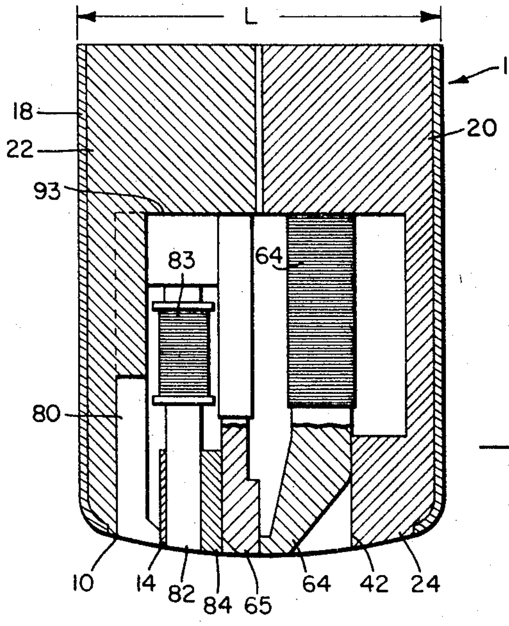
FIG. 3 is a cross-sectional view of the head assembly of FIG. 1 taken along the line 3–3.

FIG. 1 illustrates, in perspective, a magnetic head assembly referred to by the general reference character 1. The head assembly 1 may be viewed as having a width W at one end and a longitudinal length L. At the head-to-tape interface the longitudinal length may be viewed as L' and the net width as W' such that the assembly converges in the width dimension toward the head-to-tape interface surface. As illustrated, the head assembly 1 incorporates four individual record/playback transducers 2, 4, 6 and 8 for association with a four-track magnetic tape 9. For stereo operation, transducers 2 and 4 may be used simultaneously for record/playback on channels 1 and 2 of the tape 9 when the tape is transported in one direction and the transducers 6 and 8 used simultaneously for record/playback on channels 3 and 4 of the tape when in the opposite direction. Present standards call for the individual channels 1—4 to be in the order of 24 mils in width, a guard band between channels 1 and 2 in the order of 11 mils, a guard band between channels 2 and 3 in the order of 30 mils, and a guard band between channels 3 and 4 in the order of 11 mils. In front of the transducers 2 and 4 is an erase transducer 10 and in front of the transducers 6 and 8 is an erase transducer 12. Thus, immediately prior to recording on channels 1 and 2, the tape 9 will be acted upon by the erase flux of the transducer 10. Immediately prior to recording on channels 3 and 4, the tape 9 will be acted upon by the erase flux of the transducer 12. The transducers 10 and 12 each include an erase gap spacer 14 and 16, respectively. The assembly 1 incorporates a shield can 18 for magnetically shielding and encompassing the various components. Within the shield can 18 are a pair of similar carriers 20 and 22 which may be of a bakelite type material and structurally complementary. In FIG. 1 these carriers 20 and 22 are only shown at exposed surfaces at the head-to-tape interface where a pair of surfaces 24 and 26 of the carrier 20 are visible and a pair of surfaces 28 and 30 of the carrier 22 are visible. Extending from the rear surfaces of the head assembly 1 are terminal boards 32 and 34 for joining external electronics to the leads from the individual energizing coils of the transducers of the head assembly 1.

Figure 2:
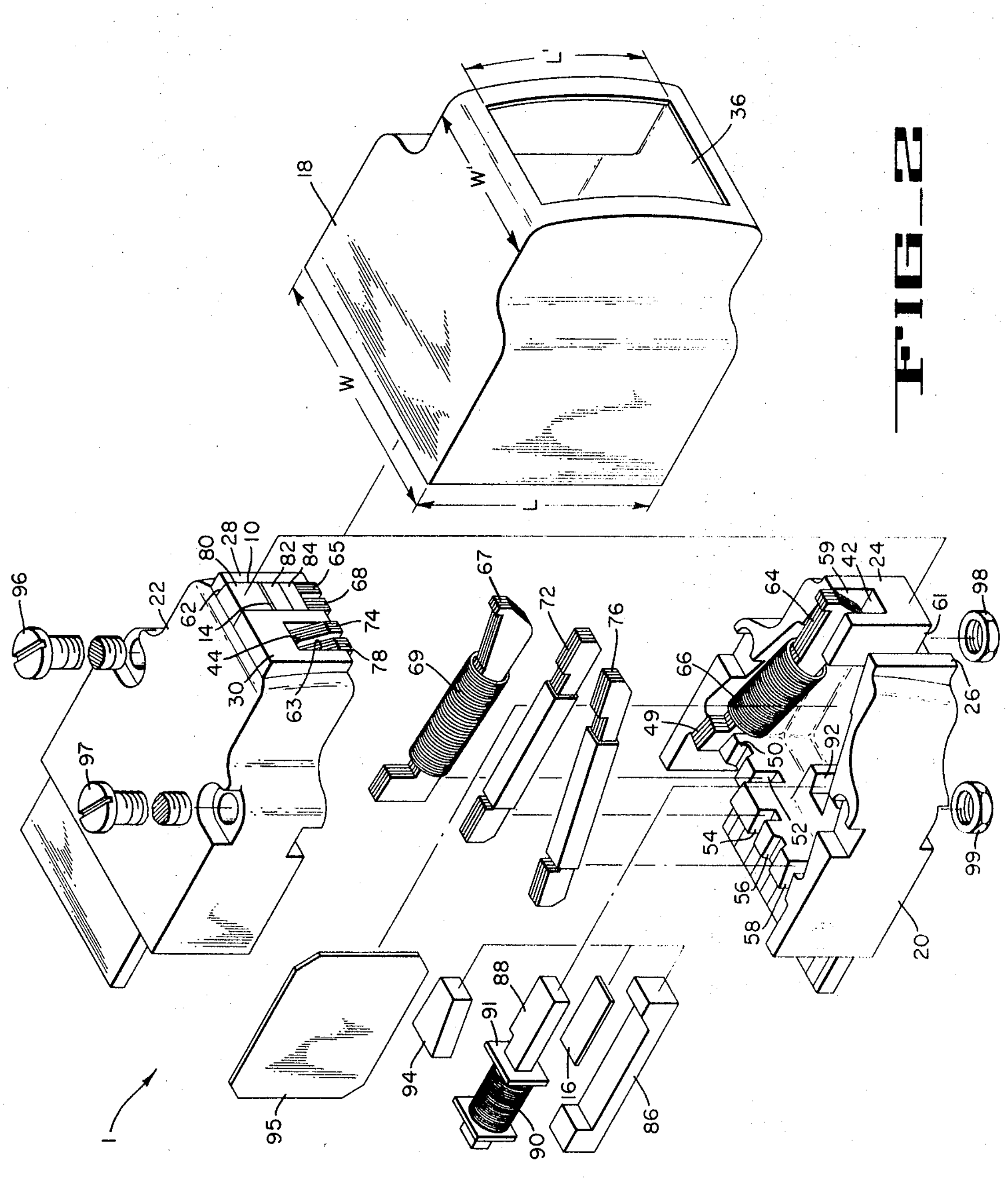
FIG. 2 is an exploded view of the head assembly of FIG. 1.

Referring to the exploded view of FIG. 2, the shield can 18 carries rectangular window 36 through which the tips of the individual transducers may protrude. The longitudinal dimension L' of the window is parallel to the longitudinal axis of the tape 9 passing over the assembly 1. The shield can 18 is such that the back opening formed by the sides associated with dimensions L and W is of considerable greater cross-sectional area than the size of the front opening at the head-to-tape interface. This permits the various core and pole members of the individual transducers to be tapered within the shield can and converge towards the head-to-tape interface. The carrier 20, as previously mentioned, has a pair of surfaces 24 and 26. The surface 24 is U-shape and is exposed through the window 36. The surface 26 is in the nature of a plain rectangle and is exposed through the window 36. The surface 24 provides a shoulder 42. Referring to the carrier 22, it will be noted that a similar relationship exists between the surfaces 28 and 30 with the surface 30 providing a shoulder 44 similar to that of shoulder 42. The surfaces 28 and 30, respectively, are exposed through the opening 36 of the can 18. The alignment of the carriers 20 and 22 is such that the surface 26 abuts one leg of the surface 30 and the surface 24 abuts the surface 28 and the other leg of the surface 30. The back surface of each of the carriers 20 and 22 has a plurality of notches 49, 50, 52, 54, 56 and 58. For clarity of explanation, the surface 24 may be viewed as forming an intermediate spacing 59 while the surfaces 24 and 26 form an intermediate spacing 61. The carrier 22 is such that the surfaces 28 and 30 form a spacing 62 and the surface 30, a spacing 63.

Figure 4:
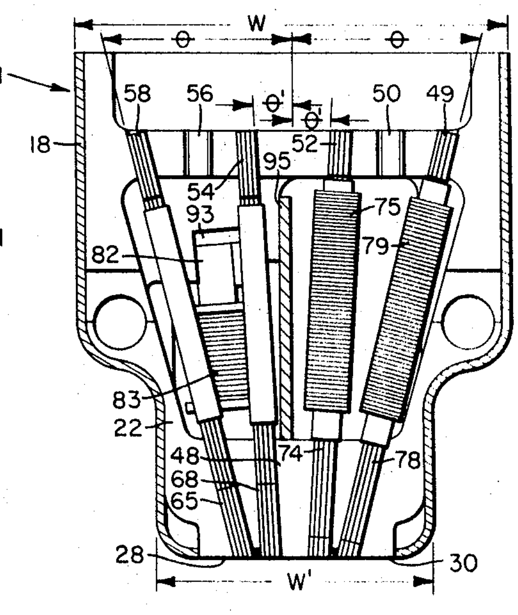
FIG. 4 is a cross-sectional view of the head assembly of FIG. 1 taken along the line 4–4.

FIGS. 2 and 4 further illustrate the plurality of individual segments of the individual transducers. The record/playback transducer 2 is formed by a core segment 64 comprising a plurality of individual mu-metal-type laminations of substantially C-configuration and a pole segment 65 incorporating a plurality of individual mu-metal-type laminations of I-configuration. The core segment 64 is supported by the carrier 20 within its notch 49 and spacing 59, resting against the shoulder 42. The pole segment 65 is supported by the carrier 22 within its notch 58 and spacing 62. The segments 64 and 65 are supported such that they converge laterally toward the head-to-tape interface at an angle Θ (see FIG. 4). An energizing coil 66 surrounds the core segment 64. The record/playback transducer 4 is formed by a core segment 67 similar to the core segment 64 and a pole segment 68 similar to the pole segment 66. The core segment 67 is supported by the carrier 20 within the notch 52 and the spacing 59 and rests against the shoulder 42. The pole segment 68 is supported by the carrier 22 within its notch 54 and spacing 62. The segments 67 and 68 are supported such that they converge laterally toward the head-to-tape interface at an angle Θ'.

The record/playback transducer 6 comprises a pole segment 72 similar to the pole segments 65 and 68 and a core segment 74 similar to the segments 64 and 67. The core segment 74 carries an energizing coil 75. The pole segment 72 is supported by the carrier 20 within its notch 54 and spacing 61 while the core segment 74 is supported by the carrier 22 within its notch 52 and spacing 63 and rests against the shoulder 44. The segments 72 and 74 are supported such that they converge laterally toward the head-to-tape interface at the angle Θ'. The record/playback transducer 8 is formed of a pole segment 76 similar to the pole segment 72 and a core segment 78 similar to the core segment 74. The core segment 78 carries an energizing coil 79. The pole segment 76 is supported by the carrier 20 within its notch 58 and spacing 61. The core segment 78 is supported by the carrier 22 within its notch 49 and spacing 63 and rests against the shoulder 44. The segments 76 and 78 are supported such that they converge laterally toward the head-to-tape interface at the angle Θ. The angles Θ and Θ' of 11°embodiments have been in the order of ° and 2°, respectively.

Adjacent to the pole segments 65 and 68 is the first erase head 10 (see FIGS. 1, 2, 3 and 4). The erase head 10 comprises a pair of ferrite core members 80 and 82 spaced apart by the gap spacer 14 to form a fringing gap. The core member 82 carries an energizing coil 83. Intermediate the erase head 10 and the pole members 65 and 68 of the record/playback transducers 2 and 4 is a shielding spacer member 84 providing magnetic insulation between the erase transducer 10 and record/playback transducers 2 and 4. It may be noted that the width of the pole members 80 and 82 of the erase head 10 is such that is spans the width of the head-to-tape interface formed by the record/playback transducers 2 and 4. Thus, the erase head is adapted to simultaneously erase channels 1 and 2 of the tape without leaving an unerased intermediate spacing.

The erase head 12 (see FIGS. 1 and 2) is a duplicate of the erase head 10 and is associated with the record/playback transducers 6 and 8. The head 12 incorporates a pair of core members 86 and 88 spaced at the front gap by the spacer 16 to form a fringing flux. The member 88 carries an energizing coil 90 wound on a bobbin 91. Viewing the carrier 20 in FIG. 2, it may be noted that the core members 86 and 88 are shorter than the core and pole segments of the record/playback transducers 2, 4, 6 or 8. The core segment 86 is designed to fit within the spacing 61 and engage a notch 92 within the carrier 20 intermediate the spacing 61 and the notches 54 and 58. A similar notch 93 exists in carrier 22 for the erase head assembly 10 (see FIGS. 3 and 4). The segment 88 slides within the notch 92 immediately adjacent to the segment 86 and the spacer 16. The alignment of the notch 92 with the spacing 61 is such that the core and pole segments 86, 88 are at an approximate 5° angle with relationship to the centerline of the assembly and converge laterally toward the longitudinal central axis at the head-to-tape interface. Adjacent to the segment 88 is a shielding spacer 94 similar to the spacer 84. The spacer 94 rests against the core 88 and magnetically insulates the erase transducer 12 from the record/playback transducers 6 and 8. A shielding spacer 95 rests within the notches 54 of the carriers 20 and 22. The spacer 95 extends parallel with the longitudinal axis and substantially magnetically divides the assembly 1 into two equal segments to shield the record/playback transducers 6 and 8 and the erase transducer 12 from the record/playback transducers 2 and 4 and the erase transducer 10. The assembly 1 may be held in place by a pair of fastener bolts 96 and 97 having a pair of associated nuts 98 and 99. It is also further structurally strengthened by an insulative potting epoxy. The lead wires of the various energizing coils extend through the notches 50 and 56 to the terminal boards 32 and 34. It may be also pointed out that though the described embodiment illustrates the energizing coils supported on the side legs of the various core members, the present design also allows for the coils to be placed on the back legs with the central axis parallel to the longitudinal movement of the tape.

The head assembly 1 is such that the individual erase transducer and record/playback transducers may be operated independently in relationship to each other. This permits the individual transducers to be individually biased to optimum conditions without affecting the others. It may also be noted, that the erase transducers 10 and 12 by extending across the full width of two associated tracks provide more complete erasure than in the case where an individual erase transducer is associated with each record/playback transducer. In the latter instances a spacing is left intermediate the two tracks which may tend to be recorded with fringe signals. It has also been found that structures in accord with the assembly 1 provide a playback output signal of 265 microvolts at 1 kilohertz and crosstalk of 48—50 db. below operating level between stereo pairs, e.g. between transducers 4 and 6.

It may be further noted that the assembly 1 is such that the need for external assembly jigs is minimized in manufacturing. The carriers 20 and 22 carry and support the individual core and pole segments in place. The only necessary jigs which the inventor has found necessary are one to keep the proper spacing between the tips of the transducers 2 and 4 and the tips of the transducers 6 and 8 at the head-to-tape interface and one to hold the carriers 20 and 22 in place. Otherwise, the assembly is self-supporting and maintains proper spacing while the assembly is internally encapsulated with insulative epoxy.

Figures 5, 6:
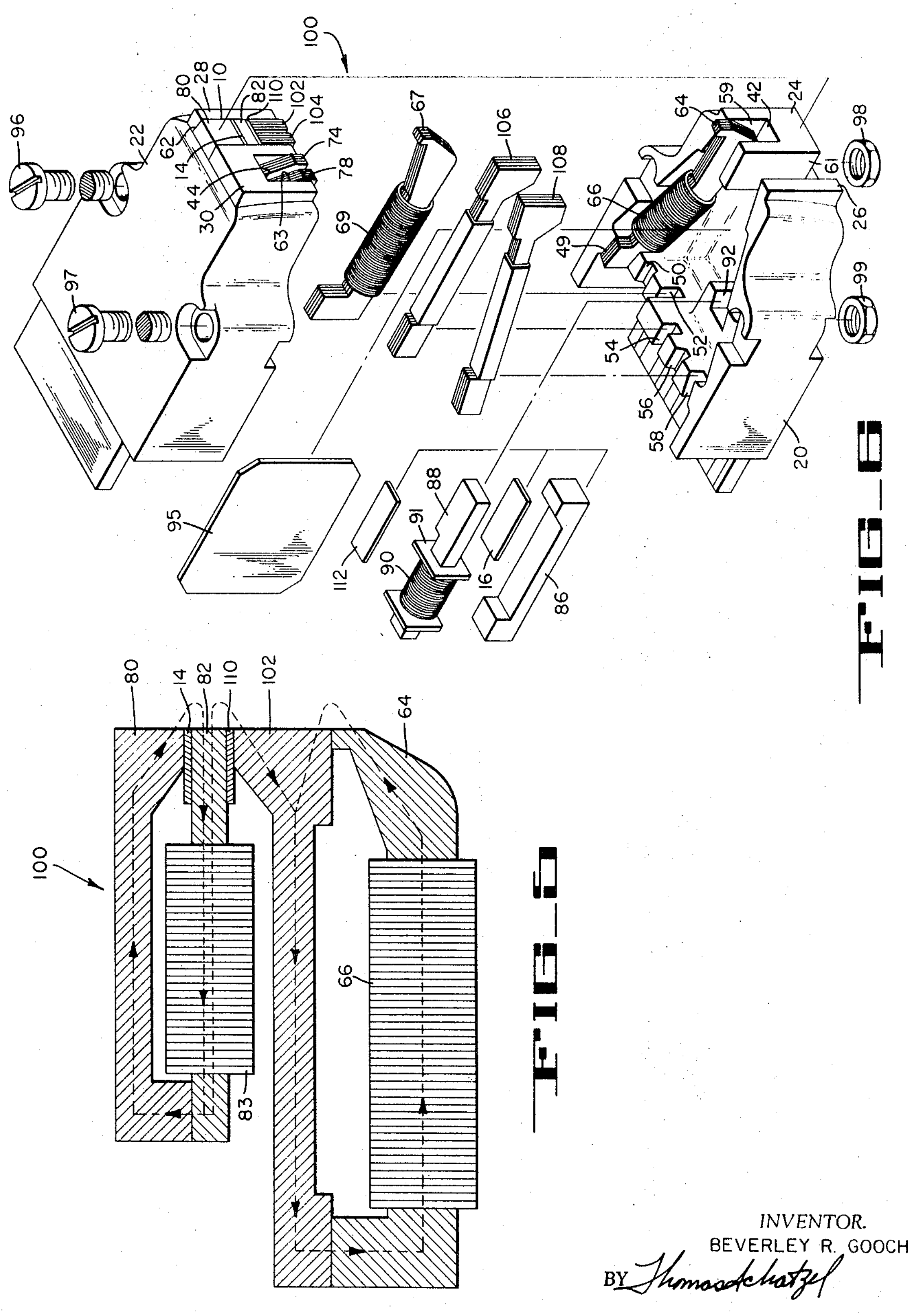
FIG. 5 is a cross-sectional view of an enlarged alternative embodiment of a magnetic head assembly according to the teachings of the present invention.
FIG. 6 is an exploded view of the head assembly of FIG. 5.

FIGS. 5 and 6 illustrate an alternative embodiment of the head assembly of the present invention. The alternative embodiment, referred to by the general reference character 100 is adapted to provide a "double-gap erase transducer" for each track. It has been found that this provides even more complete erasure of the tape (approximately 70 db. below operative level), with less power requirements than the assembly 1. It has also been found that a portion of the flux of the erase heads is transferred to the record/playback transducer and when the record/playback transducer is in the record mode this additional flux adds to the record bias flux thereby reducing the external bias requirements.

FIG. 5 depicts a cross-sectional view of the head assembly 100. FIG. 5 is analogous to the cross-sectional view of FIG. 3 of the head assembly 1. However, in FIG. 5, to avoid overcomplication of the drawing, the carrier 22 and shield assembly 18 have been omitted. Also, the components of the head assembly 100 analogous to the components of the head assembly 1 carry the same reference numerals as in the head assembly 1. FIG. 6 illustrates an exploded view of the head assembly 100.

The differences in the head assembly 100 center primarily about the shape of the pole segments of the individual record/playback transducers. The assembly 100 includes laminated pole segments 102, 104, 106 and 108 for the individual record/playback transducers 2, 4, 6 and 8, respectively. It may be noted that the pole segments, at their pole tips, are longitudinally longer than in the instance of the head assembly 1. Also referring to FIGS. 5 and 6, it may be noted that in the place of the spacers 84 and 94 a pair of erase gap spacers 110 and 112 are substituted, respectively. Accordingly, viewing the assembly 100 of FIGS. 5 and 6 there are a pair of erase gap spacers 14 and 110 intermediate the record/playback transducers 2 and 4 and the core segment of the erase transducer 10. There are a similar pair of erase gap spacers 16 and 112 intermediate the record/playback transducer 6 and 8 and the core segment of the erase transducer 12. Viewing FIG. 5 the arrowed broken line indicates the flux path created by energizing the coil 83 on the erase transducer 10. As may be noted, the erase flux simultaneously assumes alternative paths, one encircling the core and pole segments 80, 82 and the other encompassing the pole segment 82 of the erase transducer 10 and the pole and core segments 102, 64 of the associated record/playback transducer 2. The erase gap spacer 110 permits the erase flux to fringe into the tape passing over the tape-to-head interface. The portion of the erase flux transferred to the record/playback transducer 2 is such that when the transducer is energized with record current, this additional flux adds to the record bias flux. Thus, the additional flux reduces the external record bias current requirements otherwise necessary. In viewing the cross-sectional view of FIG. 5 it may be noted that the rear segment of the record/playback transducer 2 does not contact the erase transducer 10. This keeps the coupled flux in the record/playback section below the full bias requirements. Hence, each transducer (erase and record/playback) can be optimized separately using externally applied voltages. The relationship between the erase transducer 12 to the record/playback transducers 6 and 8 is similar.

I claim:

1. A bidirectional magnetic head assembly comprising:

first and second pairs of associated record/playback transducers, each transducer having an elongate core segment and an energizing coil mounted thereon and an associated elongate pole segment adapted to be disposed end-to-end with said core segment to form a nonmagnetic transducing gap between one set of adjacent ends;

a pair of complementary carriers for supporting said transducers relative to a magnetic tape, said core segments and coils of said first pair of transducers and said pole segments of said second pair of transducers being mounted in spaced-apart side-by-side relation in one of said carriers, and said core segments and coils of said second pair of transducers and said pole segments of said first pair of transducers being mounted in spaced-apart side-by-side relation in the other said carrier, said complementary carriers with said segments mounted therein being secured together in a confronting assembled relationship with associated said core and pole segments in end-to-end registration with the sets of adjacent ends forming said transducing gaps at a head-to-tape interface; and a pair of erase transducers mounted in different said carriers and in longitudinally offset relationship to each other, one of said erase transducers having an erase gap disposed in tracking relationship with said first pair of transducers and the other erase transducer having an erase gap disposed in tracking relationship with the second pair of transducers such that for one direction of tape movement one of said erase transducers may operate on the magnetic tracks associated with said first pair of transducers prior to recording and for the other direction of tape movement the other erase transducer may operate on the magnetic tracks associated with the second pair of transducers prior to recording.

2. The head assembly as defined in claim 1 further defined by said carriers each being formed with notches adapted to receive said core and pole segments of said pairs of transducers, said notches being arranged to support the segments of the first pair of transducers with their elongate axes angulated by different angles (Θ and Θ′) to one lateral side of said carriers and to support the segments of the second pair of transducers with their elongate axes angulated by different angles (Θ and Θ′) to the other lateral side of said carriers such that said first and second pairs of transducers converge from opposite lateral sides toward the head-to-tape interface.

3. The head assembly as defined in claim 1, said pair of erase transducers each having an elongate core segment and an energizing coil mounted thereon and an elongate pole segment arranged end-to-end with an associated core segment to form said erase gap at one set of adjacent ends, the core segments of said erase transducers being disposed proximate the pole segments of the pair of record/reproduce transducers in tracking registration therewith, and a nonmagnetic erase gap spacer disposed in spacing relation between each proximate erase core segment and record/reproduce transducer pole segments to provide an additional erase gap for each erase transducer and to couple flux between each said erase transducer and the pair of record/playback transducers in alignment therewith, each said erase transducer being substantially magnetically insulated from the associated said pair of record/playback transducers except at said erase gap spacers.